United States Patent
Hwang

(10) Patent No.: US 7,206,047 B2
(45) Date of Patent: Apr. 17, 2007

(54) TRANSFLECTIVE LCD WITH REFLECTIVE ELECTRODE CONTACTING THE DRAIN ELECTRODE IN BOUNDARY BETWEEN REFLECTIVE REGION AND TRANSMISSION REGION

(75) Inventor: Han-Wook Hwang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 271 days.

(21) Appl. No.: 10/965,290

(22) Filed: Oct. 15, 2004

(65) Prior Publication Data

US 2005/0140868 A1 Jun. 30, 2005

(30) Foreign Application Priority Data

Dec. 26, 2003 (KR) ...................... 10-2003-0097899

(51) Int. Cl.
G02F 1/1335 (2006.01)
(52) U.S. Cl. ...................................................... 349/114
(58) Field of Classification Search ......... 349/113–114
See application file for complete search history.

(56) References Cited

U.S. PATENT DOCUMENTS 7,106,403 B2 * 9/2006 Murai et al. ................. 349/114

* cited by examiner

Primary Examiner—David Nelms
Assistant Examiner—Phu Vu
(74) Attorney, Agent, or Firm—McKenna Long & Aldridge LLP

(57) ABSTRACT

An array substrate for a transflective LCD includes a data line and a gate line on a substrate crossing each other to define a pixel region, the pixel region including a reflective region, a transparent region and a boundary region between the reflective region and the transparent region; a thin film transistor near the crossing of the gate line and the data line, the thin film transistor including a gate electrode, a semiconductor layer, a source electrode and a drain electrode; a passivation layer in the reflective region, the passivation layer having an opening in the transparent region and the boundary region; a reflective electrode in the reflective and boundary regions, the reflective electrode contacting the drain electrode through the opening in the boundary region; and a transparent electrode contacting the reflective electrode.

37 Claims, 18 Drawing Sheets

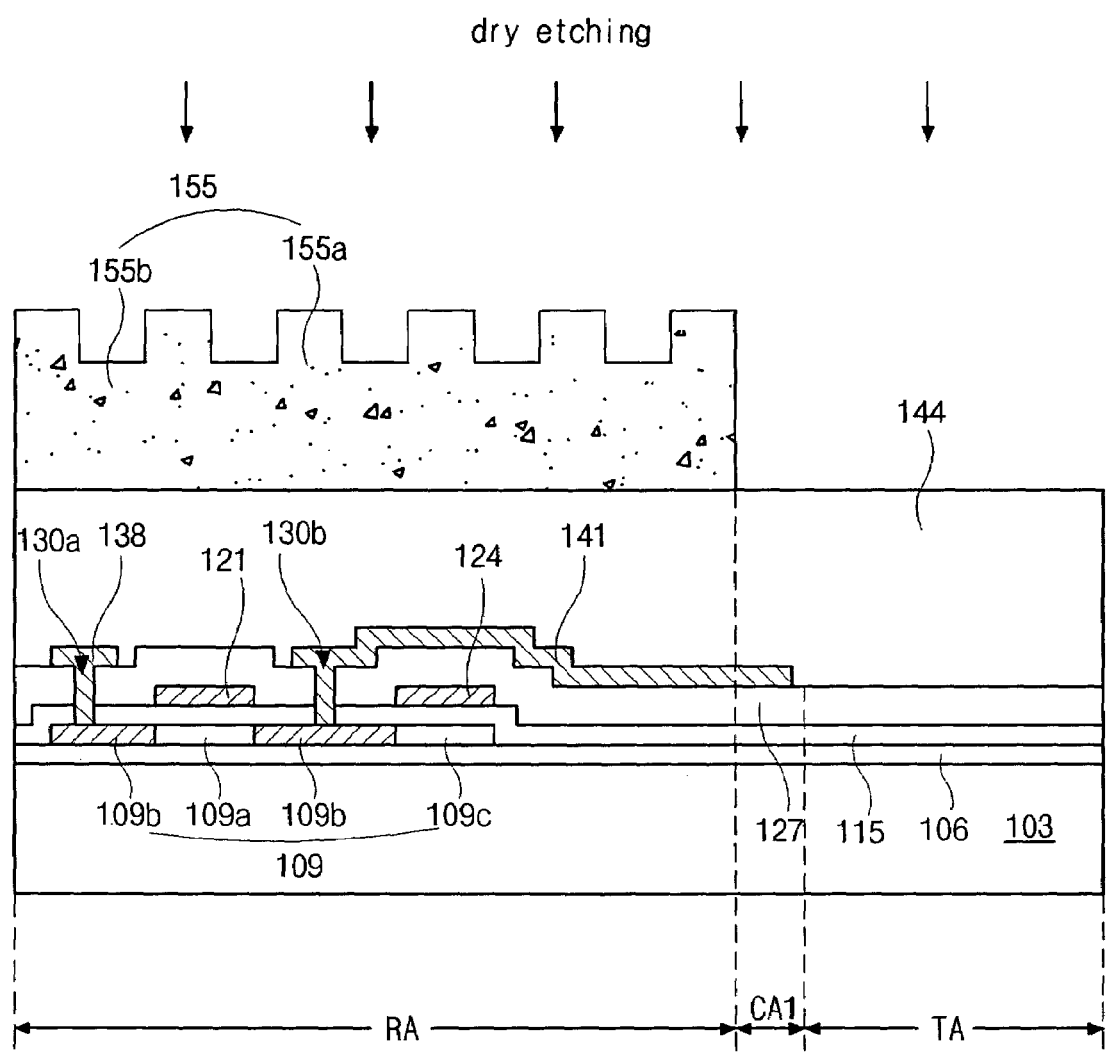

TRANSFLECTIVE LCD WITH REFLECTIVE ELECTRODE CONTACTING THE DRAIN ELECTRODE IN BOUNDARY BETWEEN REFLECTIVE REGION AND TRANSMISSION REGION

The present invention claims the benefit of Korean Patent Application No. 2003-97899 filed in Korea on Dec. 26, 2003, which is hereby incorporated by reference for all purposes as if fully set forth herein.

BACKGROUND OF THE INVENTION

1. Field of the Invention

The present invention relates to a liquid crystal display device (LCD), and more particularly, to an array substrate for a transflective LCD and fabricating method thereof.

2. Discussion of the Related Art

Until recently, display devices generally have employed cathode-ray tubes (CRTs). Presently, many efforts are being made to study and develop various types of flat panel displays, such as liquid crystal display (LCD) devices, plasma display panel (PDPs), field emission displays, and electro-luminescence displays (ELDs), as a substitute for CRTs. Of these flat panel displays, the LCD devices have several advantages such as high resolution images, lightweight, thin profile, compact size, and low voltage power supply requirements.

In general, an LCD device includes two substrates that are spaced apart and face each other, and a liquid crystal material layer interposed between the two substrates. The two substrates include electrodes that face each other, wherein a voltage supplied to each of the electrodes induces an electric field to the liquid crystal material layer. Accordingly, the alignment of liquid crystal molecules of the liquid crystal material layer changes in accordance with the intensity or direction of the induced electric field, thereby changing the light transmissivity of the LCD device. Thus, the LCD device displays images by varying the induced electric field.

Because the LCD device having a LCD panel is a non-luminous display device, the LCD device uses a light source such as a backlight unit which is disposed below the LCD panel. A light emitted from the backlight unit enters the LCD panel. The LCD using the backlight unit as a light source is a transmission type LCD. While the transmission type LCD has an advantage of displaying bright images even when the external environment is dark, the transmission type LCD consumes much power.

To improve the problem of high power consumption of the transmission type LCD, a reflection type LCD has been employed. The reflection type LCD uses an external light such as natural light. Because the reflection type LCD uses an external light, the reflection type LCD consumes less power than the transmission type LCD. A pixel electrode formed on an array substrate of the reflection type LCD is made of a reflective conductive material to reflect an external light, and a common electrode formed on a color filter substrate of the reflection type LCD is made of a transparent conductive material to transmit an external light. However, the reflection type LCD still has disadvantages in that an external light is required to display images and the brightness of the displayed images is low. Thus, a transflective LCD, which functions as either the transmission type LCD or the reflection type LCD depending on a light source, has been employed.

FIG. 1 is a plan view of a transflective LCD according to a related art.

In FIG. 1, a gate line 18 and a date line 35 are disposed on a substrate, crossing each other to define a pixel region P. The pixel region P includes a transparent region TA and a reflective region RA. A thin film transistor Tr is disposed near the crossing of the gate line 18 and the data line 35. The thin film transistor Tr includes a gate electrode 21, a source electrode 38, a drain electrode 41 and a semiconductor layer 9. The source electrode 38 is defined as a portion of the data line 35 overlapping the semiconductor layer 9. The source electrode 38 and the drain electrode 41 contact the semiconductor layer 9 through semiconductor contact holes 30a and 30b, respectively. A pixel electrode 65 contacts the thin film transistor Tr through a drain contact hole 47. A reflective electrode 62 is below the pixel electrode 65 and defines the reflective region RA. The pixel region P excluding the reflective electrode 62 is the transparent region TA. A storage line 24 is parallel to and apart from the gate line 18. Portions of the semiconductor layer 9 and the storage line 24, which overlap each other, act as first and second storage electrodes, and form a storage capacitor with a gate insulating layer. The portion of the semiconductor layer 9 overlapping the storage line 24 is an ohmic contact layer. An uneven pattern 59 is randomly formed in the reflective region RA.

FIG. 2 is a cross-sectional view taken along the line A—A in FIG. 1.

In FIG. 2, a semiconductor layer 9 including an active layer 9a, an ohmic contact layer 9b and a storage layer 9c is formed on a substrate 3, a gate insulating layer 15 is formed on the semiconductor layer 9, and a gate electrode 21 and a storage line 24 apart from the gate electrode 21 are formed on the gate insulating layer 15. A buffer layer 6 may be formed before forming the semiconductor layer 9. The storage layer 9b acts as a first storage electrode, the storage line 24 overlapping the storage layer 9b acts as a second storage electrode, and the gate insulating layer acts as a dielectric material for a storage capacitor StgC. Accordingly, the storage layer 9b, the storage line 24, and the gate insulating layer 15 define the storage capacitor StgC. On the gate electrode 21 and the storage line 24 is an interlayer 27. A source electrode 38 and a drain electrode 41 are formed on the interlayer 27 and contact the semiconductor layer 9 through semiconductor contact holes 30a and 30b, respectively.

A passivation layer 44 is formed on the source electrode 38, the drain electrode 41 and the interlayer 27 in a reflective region RA. In a transparent region TA, the passivation layer 44 is removed. The passivation layer 44 has a step between the transparent region TA and the reflective region RA. A surface of the passivation layer 44 has a uneven pattern 59. A reflective electrode 62 is formed on the passivation layer 44 in the reflective region RA, and the reflective electrode 62 has the uneven pattern 59 like the passivation layer 44. The passivation layer 44 and the reflective electrode 62 over the drain electrode 41 are patterned to form a drain contact hole 47 exposing the drain electrode 41. A pixel electrode 65 is formed on the reflective electrode 62 in the pixel region P. The pixel electrode 65 is made of a transparent conductive material and contacts the drain electrode 41 through the drain contact hole 47.

Because the transflective LCD according to the related art has the uneven pattern 59 formed randomly in the reflective region, an external light is reflected uniformly in all directions. Accordingly, the transflective LCD according to the related art reflects the external light efficiently. However, because the drain contact hole is formed in the reflective region, the area of the uneven pattern 59 in the reflective region is reduced. In addition, it is difficult to randomly form the uneven pattern in the reflective region.

SUMMARY OF THE INVENTION

Accordingly, the present invention is directed to an array substrate for a transflective liquid crystal display device and a fabricating method thereof that substantially obviate one or more of problems due to limitations and disadvantages of the related art.

An advantage of the present invention is to provide an array substrate for a transflective liquid crystal display device and a fabricating method thereof that can increase the area of a reflective region to form a uneven pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the array substrate for a transflective LCD includes a data line and a gate line on a substrate crossing each other to define a pixel region, the pixel region including a reflective region, a transparent region and a boundary region between the reflective region and the transparent region; a thin film transistor near the crossing of the gate line and the data line, the thin film transistor including a gate electrode, a semiconductor layer, a source electrode and a drain electrode; a passivation layer in the reflective region, the passivation layer having an opening in the transparent region and the boundary region; a reflective electrode in the reflective and boundary regions, the reflective electrode contacting the drain electrode through the opening in the boundary region; and a transparent electrode contacting the reflective electrode.

In another aspect, a fabricating method of an array substrate for a transflective LCD includes forming a semiconductor layer on a substrate; forming a gate line and a gate electrode; forming a data line crossing the gate line to define a pixel region and source and drain electrodes, the pixel region including a reflective region, a transparent region and a boundary region between the reflective region and the transparent region; forming a passivation layer in the reflective region, the passivation layer having an opening in the transparent region and the boundary region; forming a reflective electrode in the reflective region, the reflective electrode contacting the drain electrode through the opening in the boundary region; and forming a transparent electrode contacting the reflective electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10A to 10J are cross-sectional views, which are taken along the line B—B in FIG. 3, of a fabricating method of a transflective LCD according to the first embodiment of the present invention;

DETAILED DESCRIPTION OF THE ILLUSTRATED EMBODIMENTS

Reference will now be made in detail to the preferred embodiments, examples of which are illustrated in the accompanying drawings.

Figure 1:
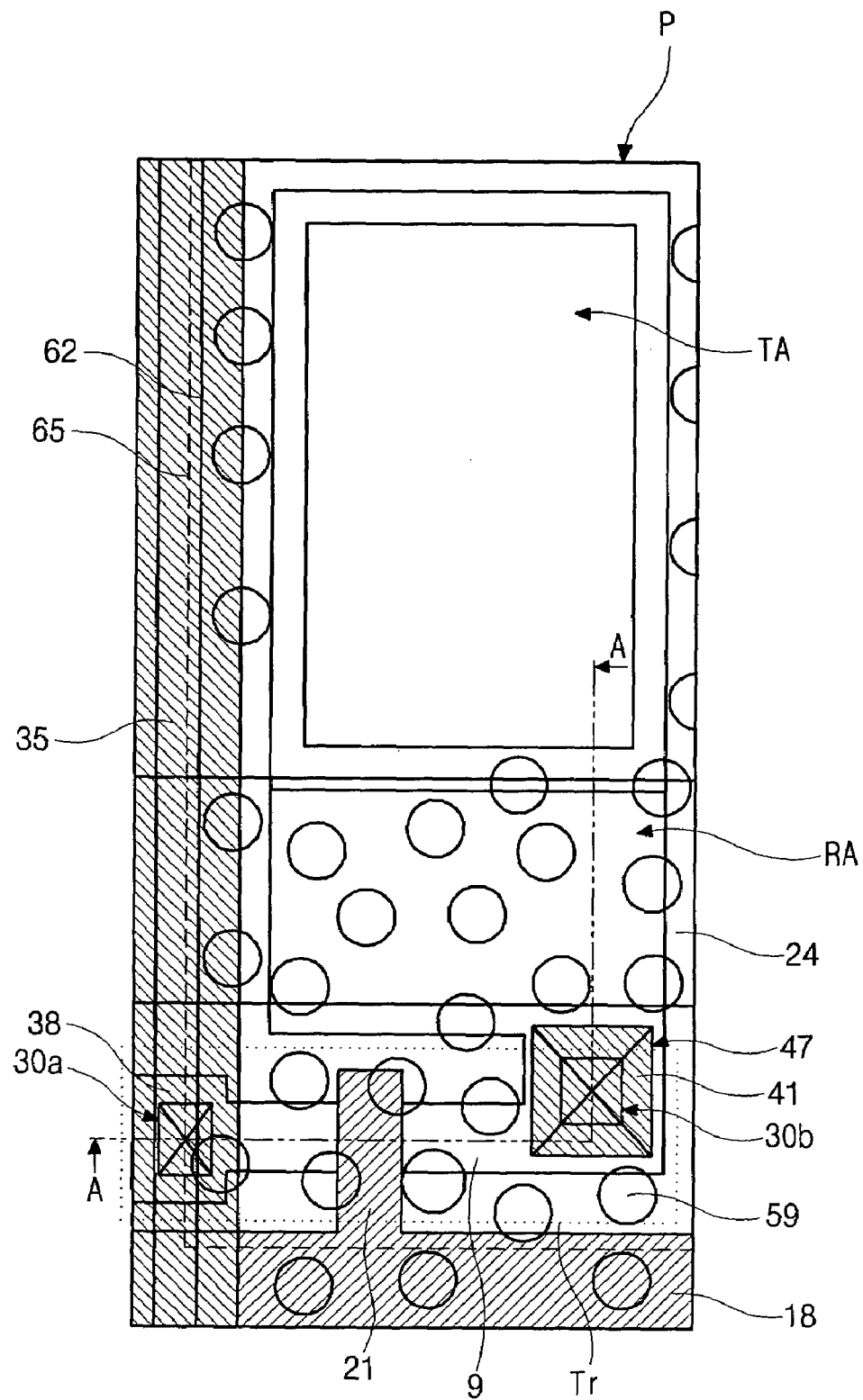
FIG. 1 is a plan view of a transflective LCD according to a related art.
Figure 2:
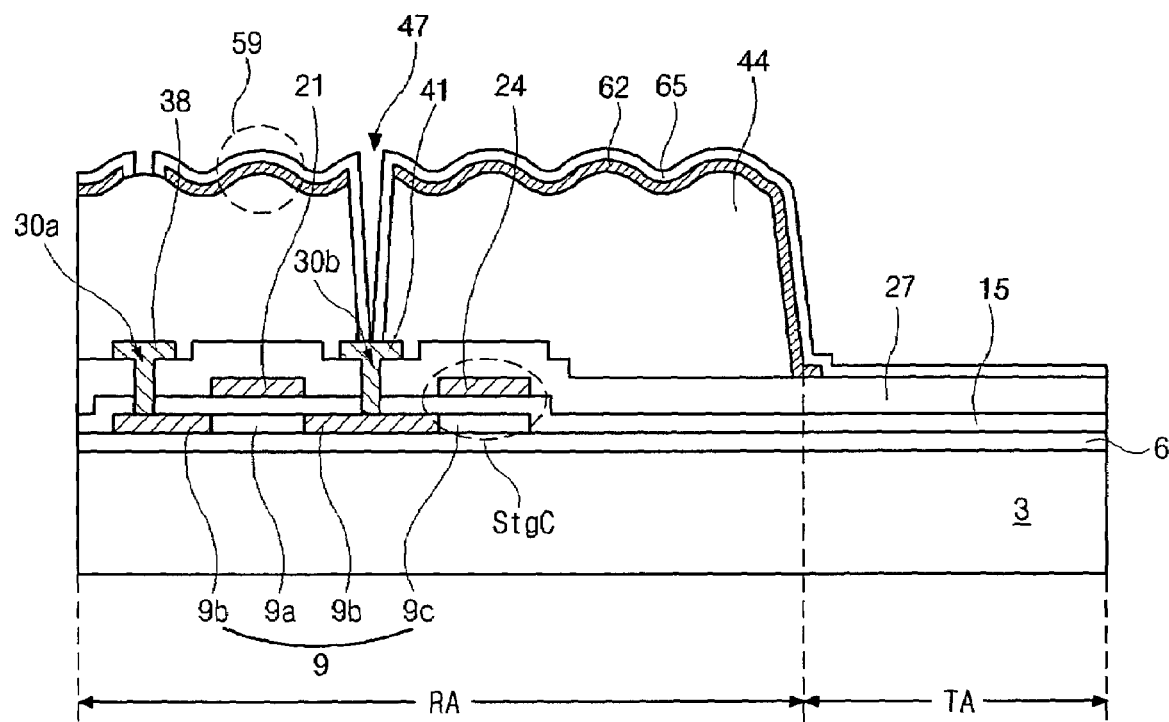
FIG. 2 is a cross-sectional view taken along the line A—A in FIG. 1.
Figure 3:
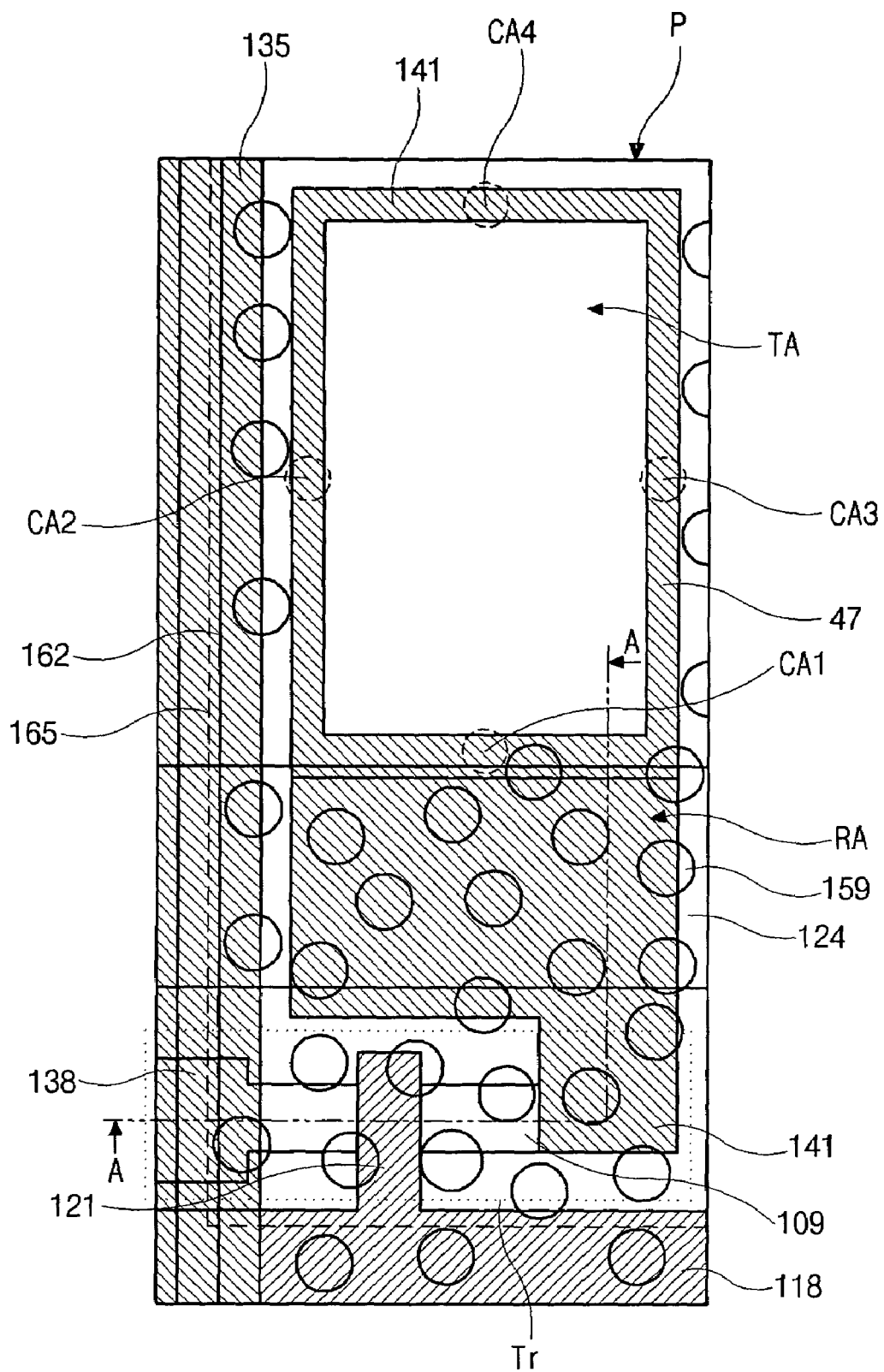
FIG. 3 is a plan view of a transflective LCD according to a first embodiment of the present invention.
Figure 4:
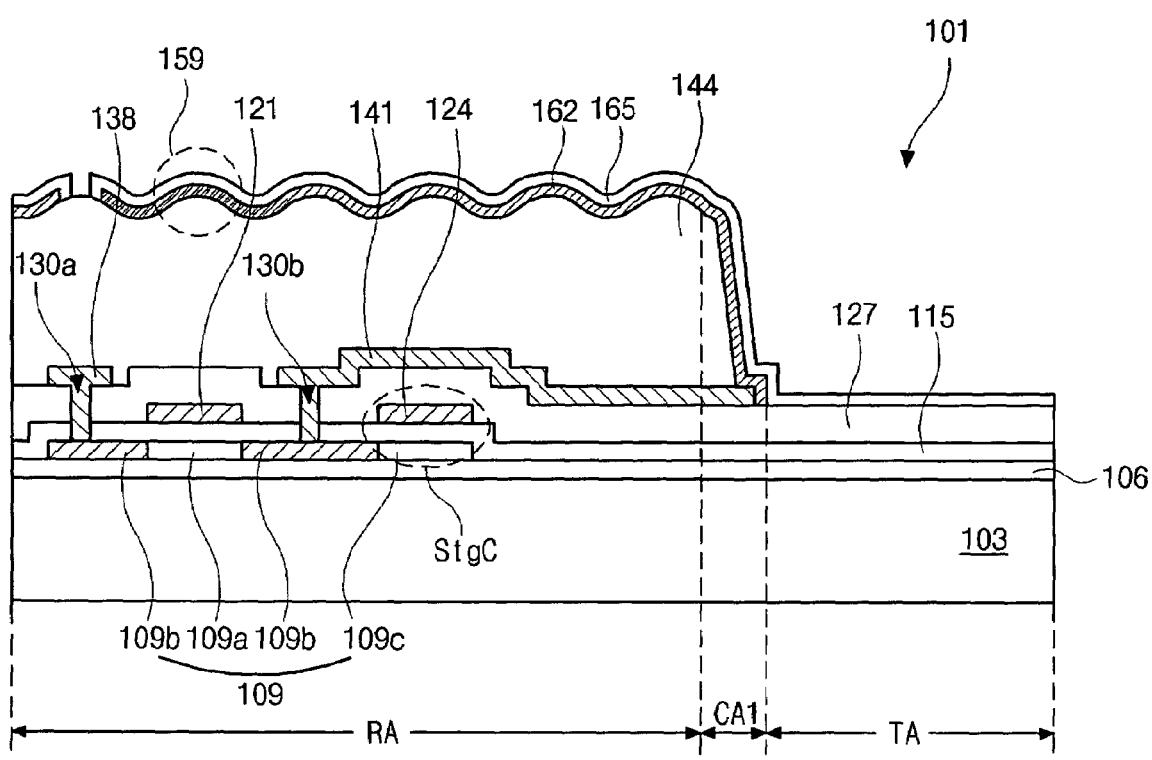
FIG. 4 is a cross-sectional view taken along the line B—B in FIG. 3.

FIG. 3 is a plan view of a transflective LCD according to a first embodiment of the present invention, and FIG. 4 is a cross-sectional view taken along the line B—B in FIG. 3.

In FIG. 3, a gate line 118 and a date line 135 are disposed on a substrate, crossing each other to define a pixel region P. A thin film transistor Tr is disposed near the crossing of the gate line 118 and the data line 135. A storage line 124 is parallel to and apart from the gate line 118.

The pixel region P includes a transparent region TA and a reflective region RA. A reflective electrode 162 is formed in the reflective region RA and is not formed in the transparent region TA. The reflective electrode 162 has a uneven pattern 159. The pixel electrode 165 is formed in the pixel region P. The pixel electrode 165 overlaps the gate line 118 and the data line 135, and the adjacent pixel electrodes 165 formed in the adjacent pixel regions P are spaced apart from each other. A boundary region is formed in the boundary between the transparent region TA and the reflective region RA. The transparent region TA may have a rectangular shape, and the boundary region may include first, second, third and fourth boundary portions CA1, CA2, CA3 and CA4 at four side portions of the transparent region TA.

The thin film transistor Tr includes a gate electrode 121, a source electrode 138, a drain electrode 141 and a semiconductor layer 109. The source electrode 138 is defined as a portion of the data line 135 overlapping the semiconductor layer 109. The source electrode 138 and the drain electrode 141 contact the semiconductor layer 109. The semiconductor layer 109 overlaps the gate electrode 121 and the storage line 124. The drain electrode 141 is formed in the reflective region RA, overlapping the storage line 124 and extending to the first, second, third and fourth boundary portions CA1, CA2, CA3 and CA4.

In FIG. 4, a buffer layer 106 is formed on a substrate 103, and a semiconductor layer 9 is formed on the buffer layer 106. The semiconductor layer 109 may be made of poly-crystalline silicon. The semiconductor layer 109 includes an active layer 109a at a center portion of the semiconductor 109, an ohmic contact layer 109b at both outer portions of the semiconductor 109, and a storage layer 109c corresponding to a storage line 124. The active layer 109a and the storage layer 109c are not doped with impurities, but the ohmic contact layer 109b is doped with impurities such as n+ and p+ ions.

A gate insulating layer 115 is formed entirely on the substrate 103 having the semiconductor layer 109. A gate electrode 121 and the storage line 124 apart from each other are formed on the gate insulating layer 115. The gate electrode 121 is formed directly over the active layer 109a. The storage layer 109c acts as a first storage electrode, the storage line 124 overlapping storage layer 109c acts as a second storage electrode, and the gate insulating layer acts as a dielectric material for a storage capacitor StgC. Accordingly, storage layer 109c, the storage line 124, and the gate insulating layer 115 define the storage capacitor StgC. On the gate electrode 121 and the storage line 124 is an interlayer 127. The interlayer 127 has semiconductor contact holes 130a and 130b exposing the ohmic contact layer 109b.

A source electrode 138 and a drain electrode 141 apart from each other are formed on the interlayer 127 and contact the ohmic contact layer 109b through the semiconductor contact holes 130a and 130b, respectively. The drain electrode 141 overlaps the storage line 124, and extends to the reflective region RA and a first boundary portion CA1. As shown in FIG. 3, the drain electrode 141 further extends to the second, third and fourth boundary portions CA2, CA3 and CA4.

A passivation layer 144 is formed on the source electrode 138, the drain electrode 141 and the interlayer 127 in the reflective region RA. In a transparent region TA, the passivation layer 144 is removed to form an opening 101. The opening 101 corresponds to the transparent region TA. An end portion of the drain electrode 141 in the first boundary portion CA1 is exposed through the opening 101. The passivation layer 144 has an inclined step in the first boundary portion CA1. A surface of the passivation layer 144 has a uneven pattern 159.

A reflective electrode 162 is formed on the passivation layer 144. The reflective electrode 162 directly contacts the end portion of the drain electrode 141 in the first boundary portion CA1. The reflective electrode 162 has the uneven pattern 159 like the passivation layer 144. The reflective electrode 162 is made of a high reflective and conductive material. A pixel electrode 165 is formed on the reflective electrode 162 in the pixel region P. The pixel electrode 165 is made of a transparent conductive material.

As shown FIGS. 3 and 4, the transflective LCD according to the first embodiment of the present invention does not have a drain contact hole in the reflective region to connect the drain electrode with the pixel electrode. Instead, the drain electrode extends to the boundary region defined at side edges of the transparent region, the reflective electrode contacts the drain electrode at the boundary region, and the pixel electrode is electrically connected with the drain electrode through the reflective electrode formed below the pixel electrode. Accordingly, the area of the reflective region in the first embodiment of the present invention is larger than that of the transflective LCD in the related art. In addition, the uneven pattern can be formed more randomly in the reflective region because the drain contact hole is not formed in the reflective region.

FIGS. 5 to 8 are plan views of transflective LCDs according to second to fifth embodiments of the present invention, respectively. Since the transflective LCDs in FIG. 5 to 8 are similar to that shown in FIG. 3, explanations of the similar parts are omitted hereinafter.

Figure 5:
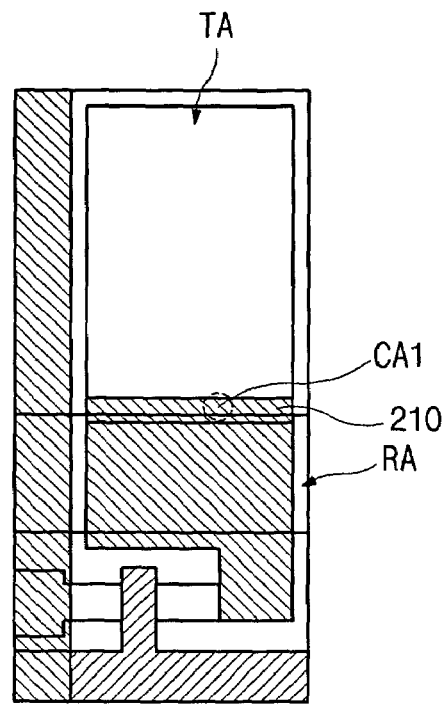
FIGS. 5 to 8 are plan views of transflective LCDs according to second to fifth embodiments of the present invention, respectively.

In FIG. 5, the transflective LCD according to the second embodiment of the present invention has a drain electrode 210 formed in a first boundary portion CA1 of the boundary region in FIG. 3.

Figure 6:
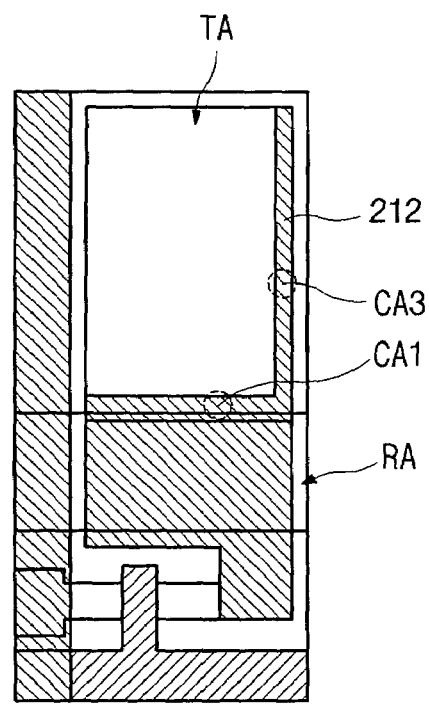

In FIG. 6, the transflective LCD according to the third embodiment of the present invention has a drain electrode 212 formed in first and third boundary portions CA1 and CA3 of the boundary region in FIG. 3.

Figure 7:
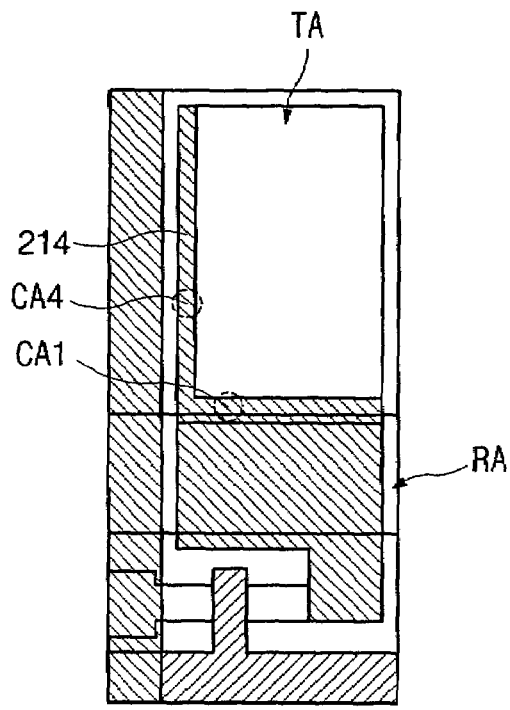

In FIG. 7, the transflective LCD according to the fourth embodiment of the present invention has a drain electrode 214 formed in first and second boundary portions CA1 and CA2 of the boundary region in FIG. 3.

Figure 8:
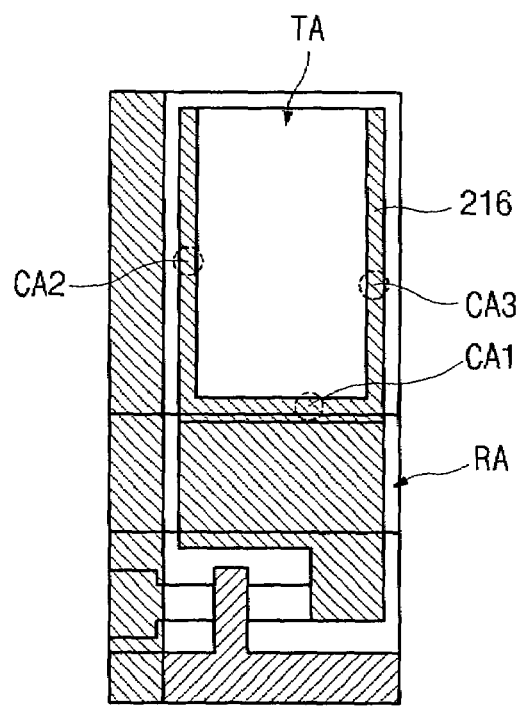

In FIG. 8, the transflective LCD according to the fifth embodiment of the present invention has a drain electrode 216 formed in first, second and third boundary portions CA1, CA2 and CA3 of the boundary region in FIG. 3.

FIGS. 9A to 9E are plan views of a fabricating method of a transflective LCD according to the first embodiment of the present invention. FIGS. 10A to 10J are cross-sectional views, which are taken along the line B—B in FIG. 3, of a fabricating method of a transflective LCD according to the first embodiment of the present invention.

Figure 9A:
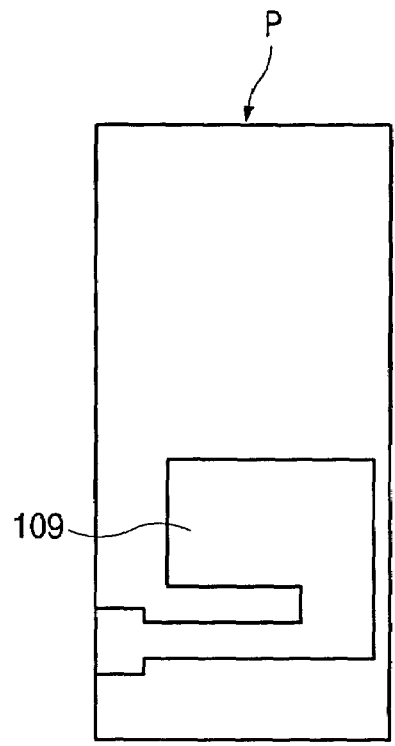
FIGS. 9A to 9E are plan views of a fabricating method of a transflective LCD according to the first embodiment of the present invention.
Figure 10A:
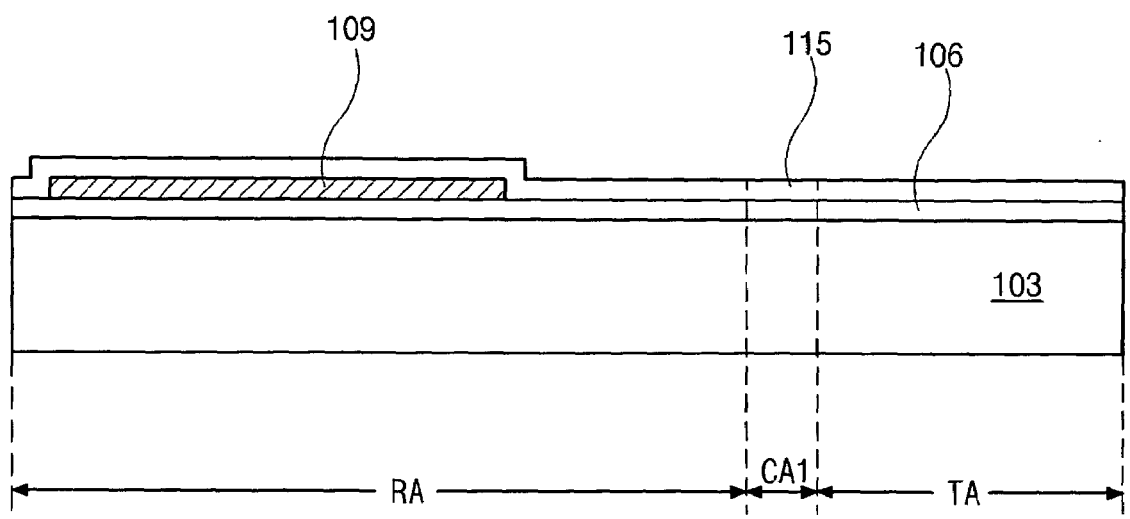

In FIGS. 9A and 10A, a buffer layer 106 of an inorganic insulating material is formed on a substrate 103. An amorphous silicon material is deposit on the buffer layer 106 and is crystallized to form a poly-crystalline silicon layer. A photo-resist is deposit on the poly-crystalline silicon layer, and then the poly-crystalline silicon layer is patterned through the photo-resist to form a semiconductor layer 109. A gate insulating layer 115 of an inorganic insulating material is formed on the substrate 103 having the semiconductor layer 109.

Figure 9B:
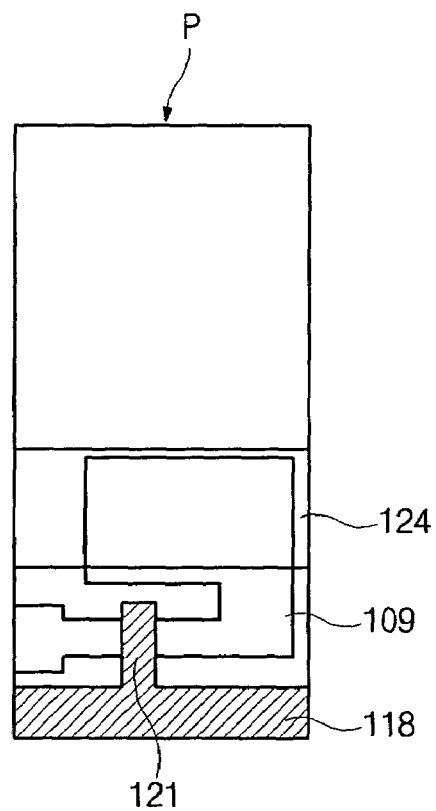
Figure 10B:
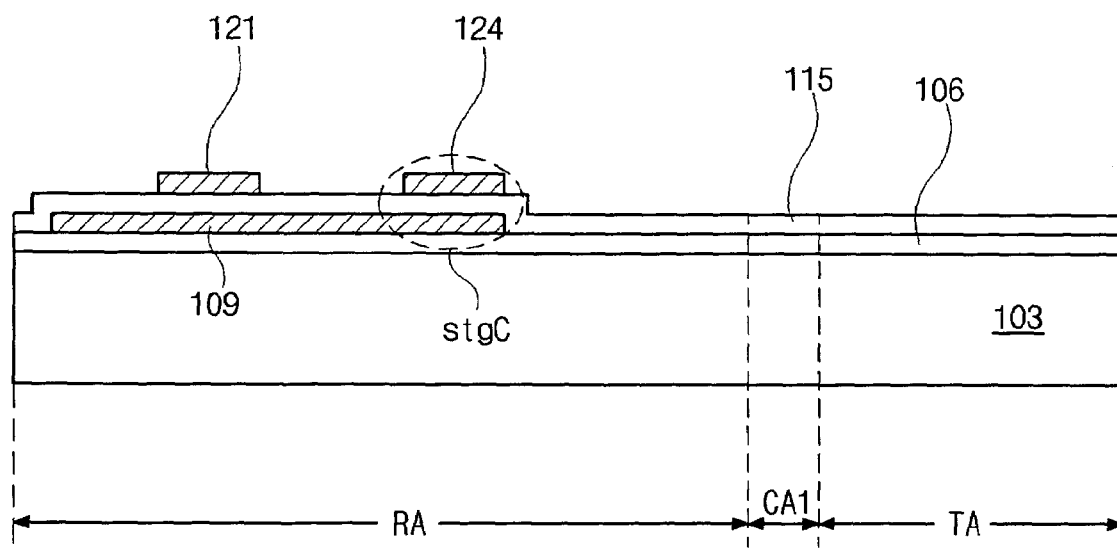

In FIGS. 9B and 10B, a metal material is deposit on the gate insulating layer 115 and is patterned to form a gate line 118, a gate electrode 121 extended from the gate line 118 and a storage line 124 parallel to and apart from the gate line 118. The semiconductor layer 109, the storage line 124 and the gate insulating layer 115 overlapping each other define the storage capacitor StgC.

Figure 10C:
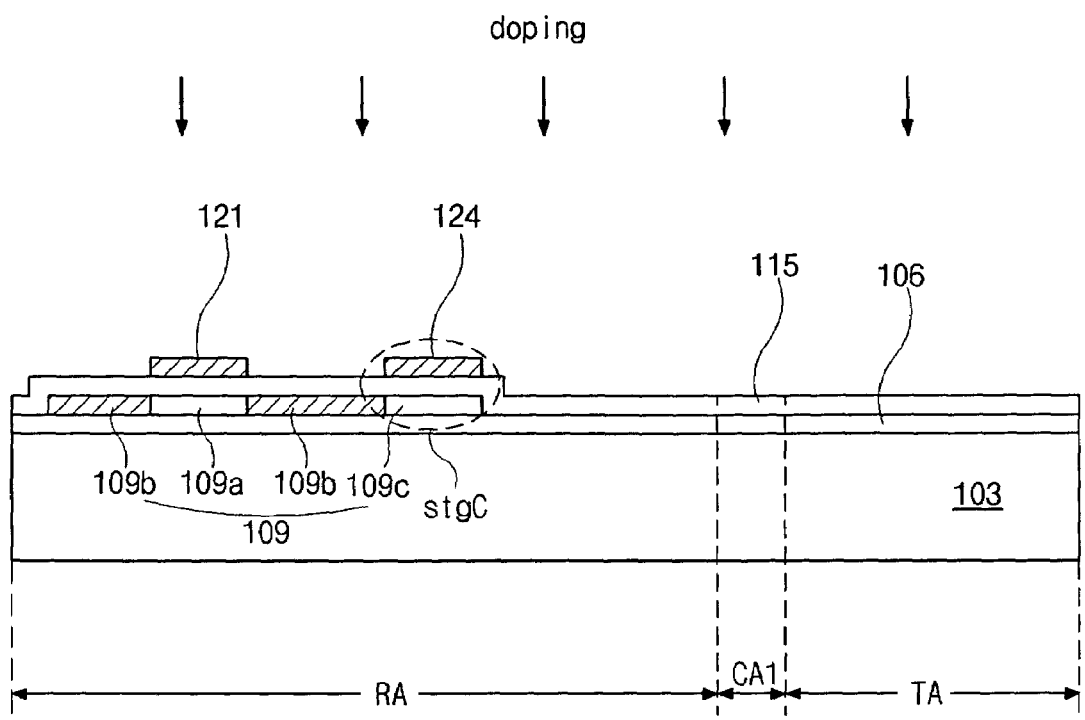

In FIG. 10C, The gate electrode 121 and the storage line 124 acts as a blocking mask to dope the semiconductor layer 109 with impurities such as n+ and p+ ions. The gate electrode 121 and the storage line 124 prevents the semiconductor directly below the gate electrode 121 and the storage line 124 from being doped with impurities. The semiconductor layer 109 is doped with a large quantity of impurities through the gate electrode 121 and the storage line 124 so that an active layer 109a and an storage layer 109c not doped and an ohmic contact layer 109b doped are formed. The active layer 109a and the storage layer 109c correspond to the gate electrode 121 and the storage line 124, respectively. The storage layer 109c acts as a first storage electrode, the storage line 124 overlapping the ohmic contact layer 109b acts as a second storage electrode, and the gate insulating layer 115 acts as a dielectric material for a storage capacitor StgC. Accordingly, the storage layer 109c, the storage line 124 and the gate insulating layer 115 define the storage capacitor StgC. In explanation of FIGS. 10B and 10C, the gate electrode 121 and the storage line 124 is used as the blocking mask. However, it should be understood that when, for example, a photo-resist is used as the blocking. When a photo-resist is used as the blocking, the photo-resist can be formed at a portion where the gate electrode 121 will be later, the semiconductor layer 109 can be doped with impurities through the photo-resist, then the the gate electrode 121 can be formed. In addition, when the photo-resist is used as the blocking, then the storage layer 109c can be doped with impurities, because the photo-resist corresponds to the gate electrode 121.

Figure 9C:
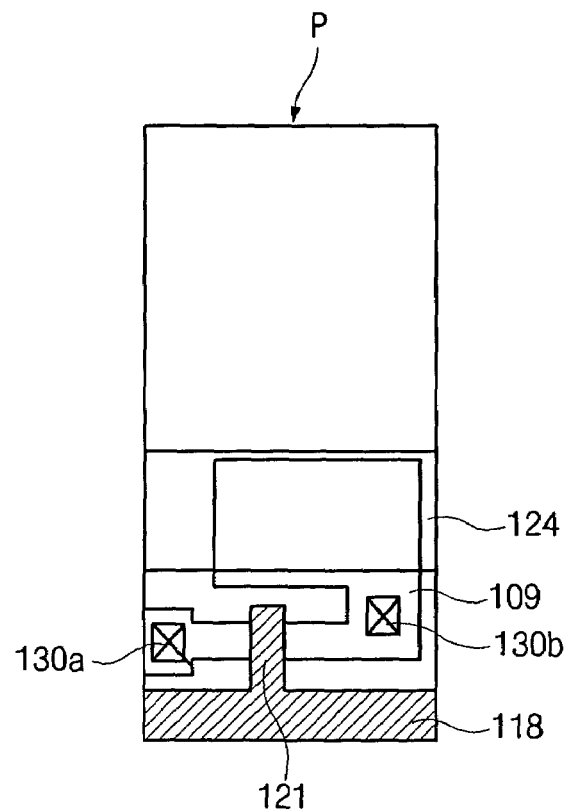
Figure 10D:
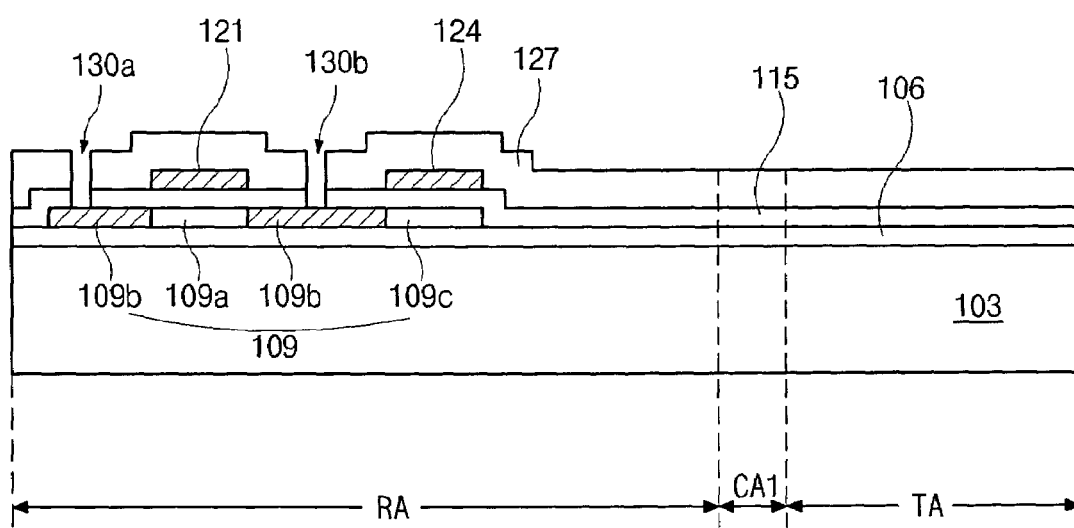

In FIGS. 9C and 10D, an interlayer 127 of an inorganic material is formed on the substrate having the gate electrode 121 and the storage line 124 and is patterned to form semiconductor contact holes 130a and 130b exposing the ohmic contact layer 109b.

Figure 9D:
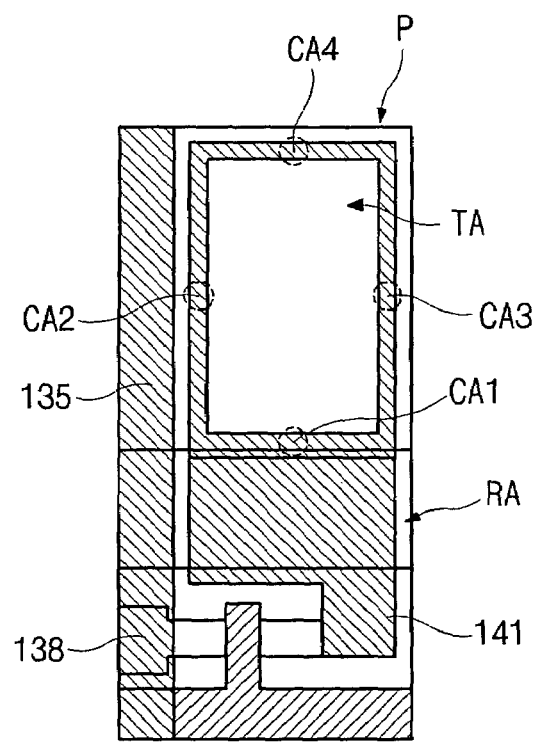
Figure 10E:
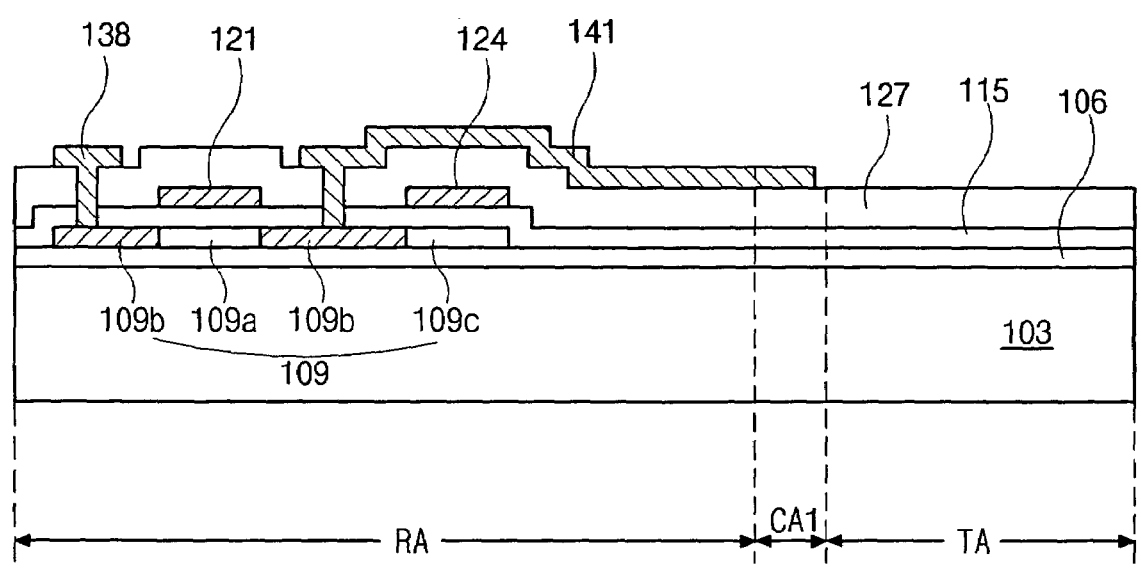

In FIGS. 9D and 10E, a metal material is deposited on the interlayer 127 and is patterned to form a data line 135 crossing the gate line 118, a source electrode 138 and a drain electrode 141. The source electrode 138 is defined as a portion of the data line 135 overlapping the semiconductor layer 109. The drain electrode 141 overlaps the storage line 124, the ohmic contact layer 109b and the storage layer 109c, and extends to the reflective region RA and a first boundary portion CA1. As shown in FIG. 9D, the drain electrode 141 further extends to the second, third and fourth boundary portions CA2, CA3 and CA4.

Figure 9E:
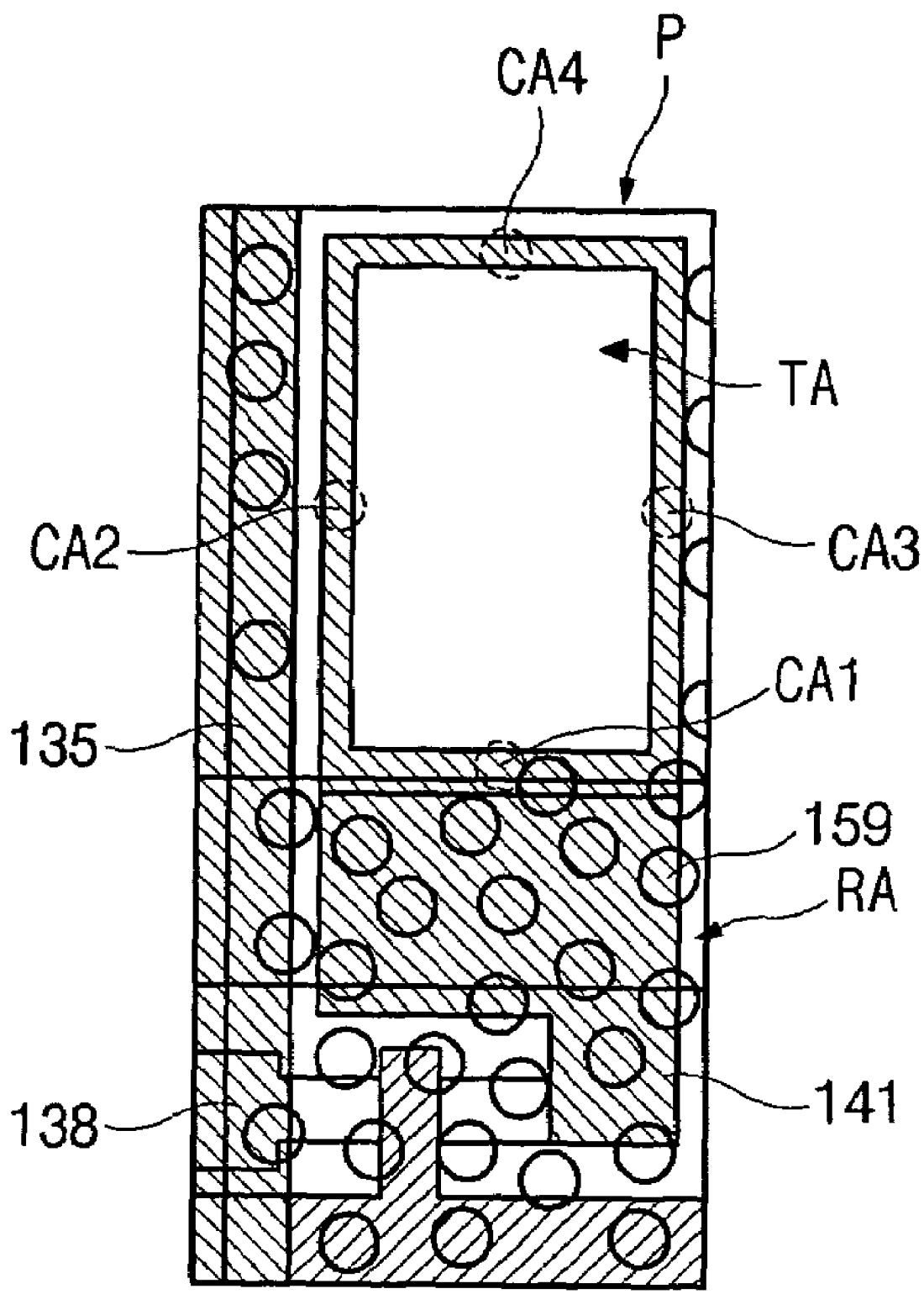
Figure 10F:
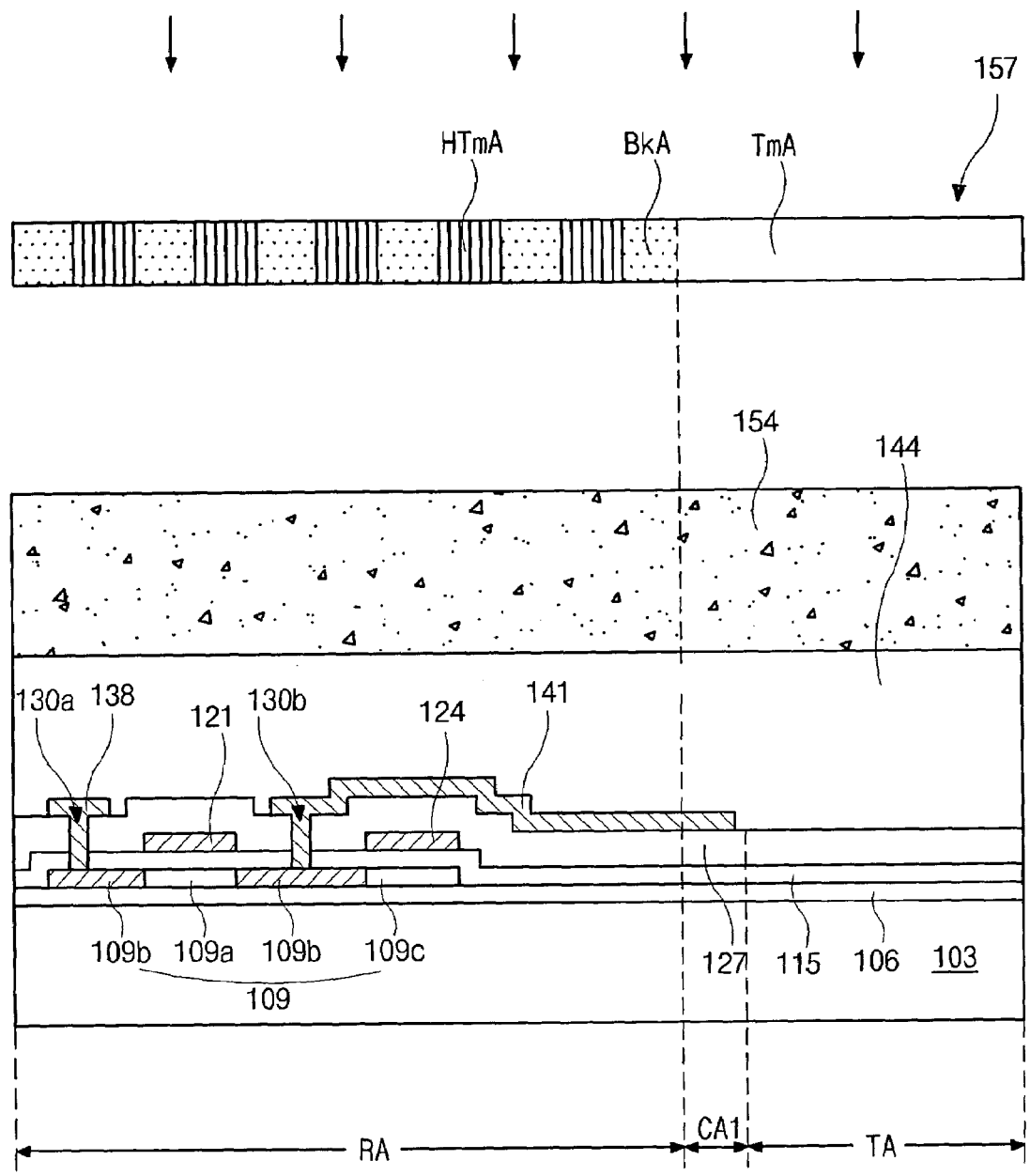

In FIGS. 9E and 10F, a passivation layer 144 of an organic material such as benzocyclobutene is formed on the source electrode 138 and the drain electrode 141. A photo-resist 154 is deposited on the passivation layer 144. A photo-mask 157, which has a transparent portion TmA, a blocking portion BkA and a semi-transparent portion HTmA, is disposed over the photo-resist 154. The photo-resist 154 may be a positive type photo-resist. For a positive type photo-resist, the portions of the photo-resist exposed by light are removed during a developing process. The transparent portion TmA is disposed at a portion corresponding to the transparent region TA, the blocking portion BkA is disposed at a portion corresponding to convex shapes of a uneven pattern 159 of the reflective region RA, and the semi-transparent portion HtmA is disposed at a portion corresponding to concave shapes of the uneven pattern 159 in the reflective region RA. The photo-resist 154 is exposed to a light through the photo-mask 157 and undergoes a developing process so that the photo-resist 154 corresponding to the transparent region TA is removed, and the photo-resist 154 corresponding to the reflective region RA becomes to have the photo-resist pattern 155 in FIG. 10G.

The photoresist pattern 155 includes first and second patterns 155a and 155b, which have different thicknesses from each other. The first pattern 155a having a convex shape, which is thicker than the second pattern 155b, is formed at a portion corresponding to the blocking portion BkA, and the second pattern 155b having a concave shape is formed at a portion corresponding to the semi-transparent portion HTmA. Then, the passivation layer 144 is dry-etched with the photoresist pattern 155. In this explanation, a photoresist is used to pattern the passivation layer 144. However, it should be understood that when, for example, a photo-organic insulating layer such as photo-acrylic is used for the passivation layer 144, then the passivation pattern can be formed without using a photoresist, because the photo-organic insulating layer itself works as a photoresist. Accordingly, when a photo-organic insulating layer is used for the passivation layer in an embodiment of the present invention, then the dry-etching and photo-resist stripping processes can be eliminated from the manufacturing process.

Figure 10H:
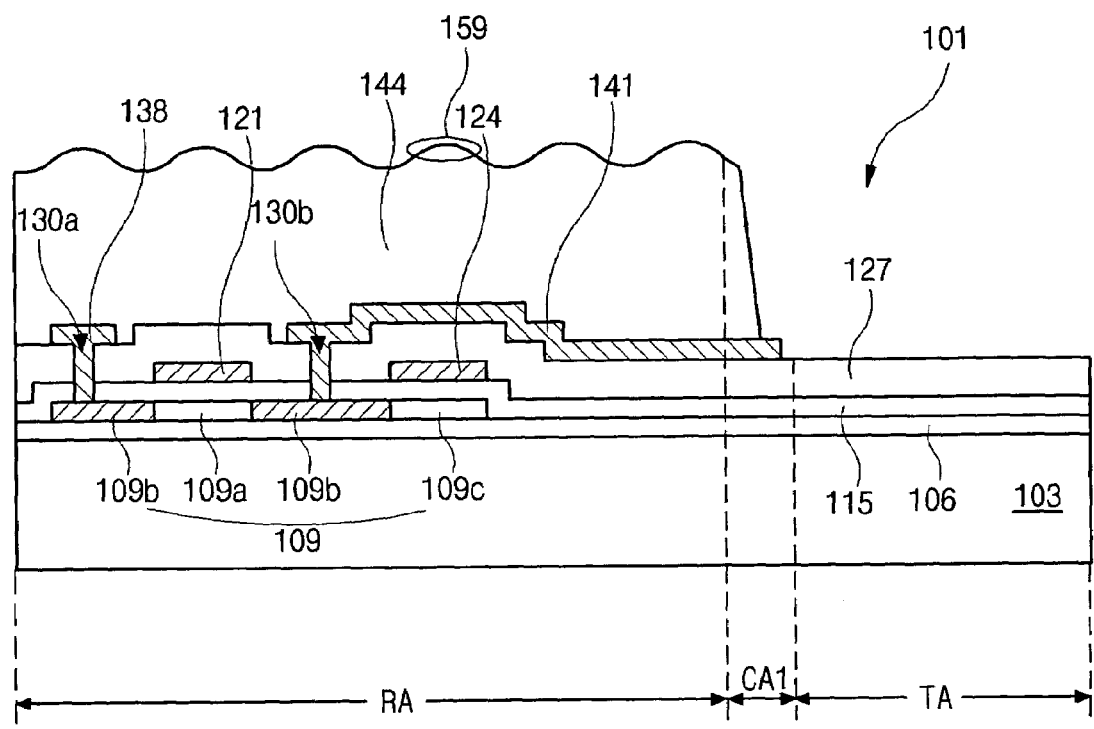

In FIG. 10H, the passivation layer 144 corresponding to the transparent region TA is removed to form an opening 101. The opening 101 exposes the interlayer 127 corresponding to the transparent region TA. The passivation layer 144 corresponding to the first boundary portion CA1 has an inclined step, and an end potion of the drain electrode in the first boundary portion CA1 is exposed through the opening 101. In addition, a surface of the passivation layer 144 corresponding to the reflective region RA has the uneven pattern 159 because of the photoresist pattern 155 (in FIG. 10G) having concave and convex shapes. The uneven pattern 159 of the passivation layer 144 is a smooth surface with concave and convex shapes because the passivation layer 144 is treated by a thermal process.

Figure 10I:
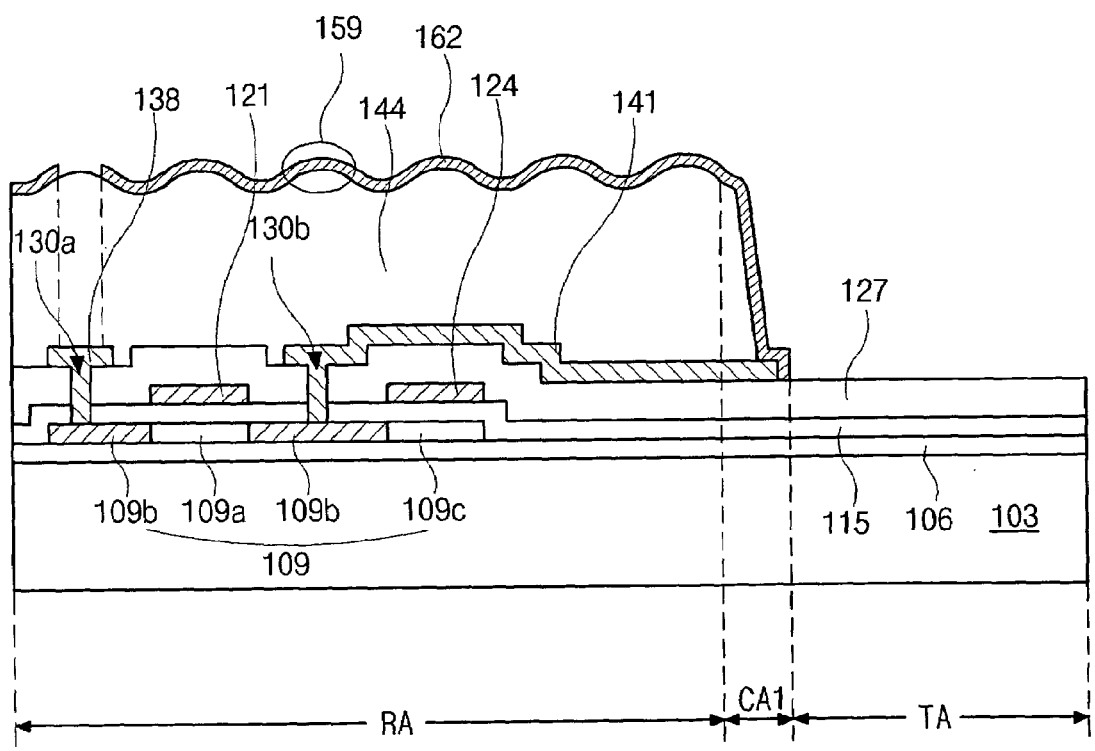

In FIG. 10I, a reflective electrode 162 of a high reflective and conductive material is formed on the passivation layer 144. The reflective electrode 162 directly contacts the end portion of the drain electrode 141 in the first boundary portion CA1. The reflective electrode 162 has the uneven pattern 159 like the passivation layer 144.

Figure 10J:
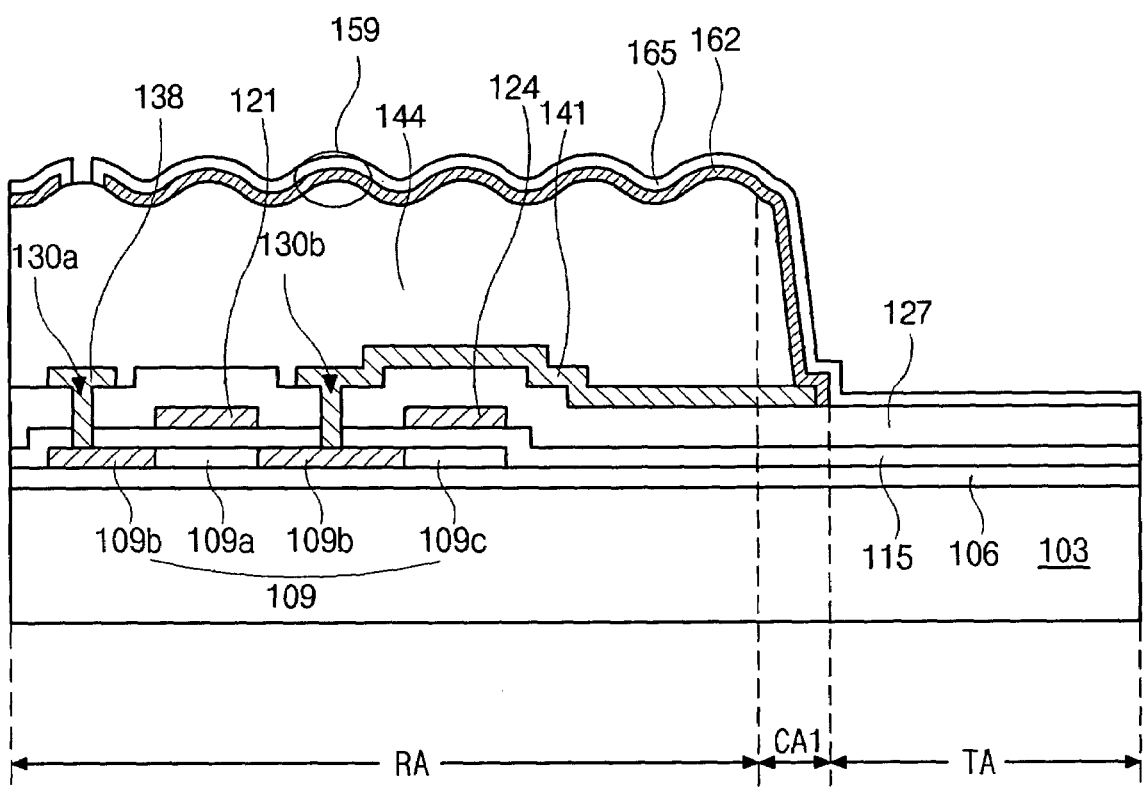
Figure 11:
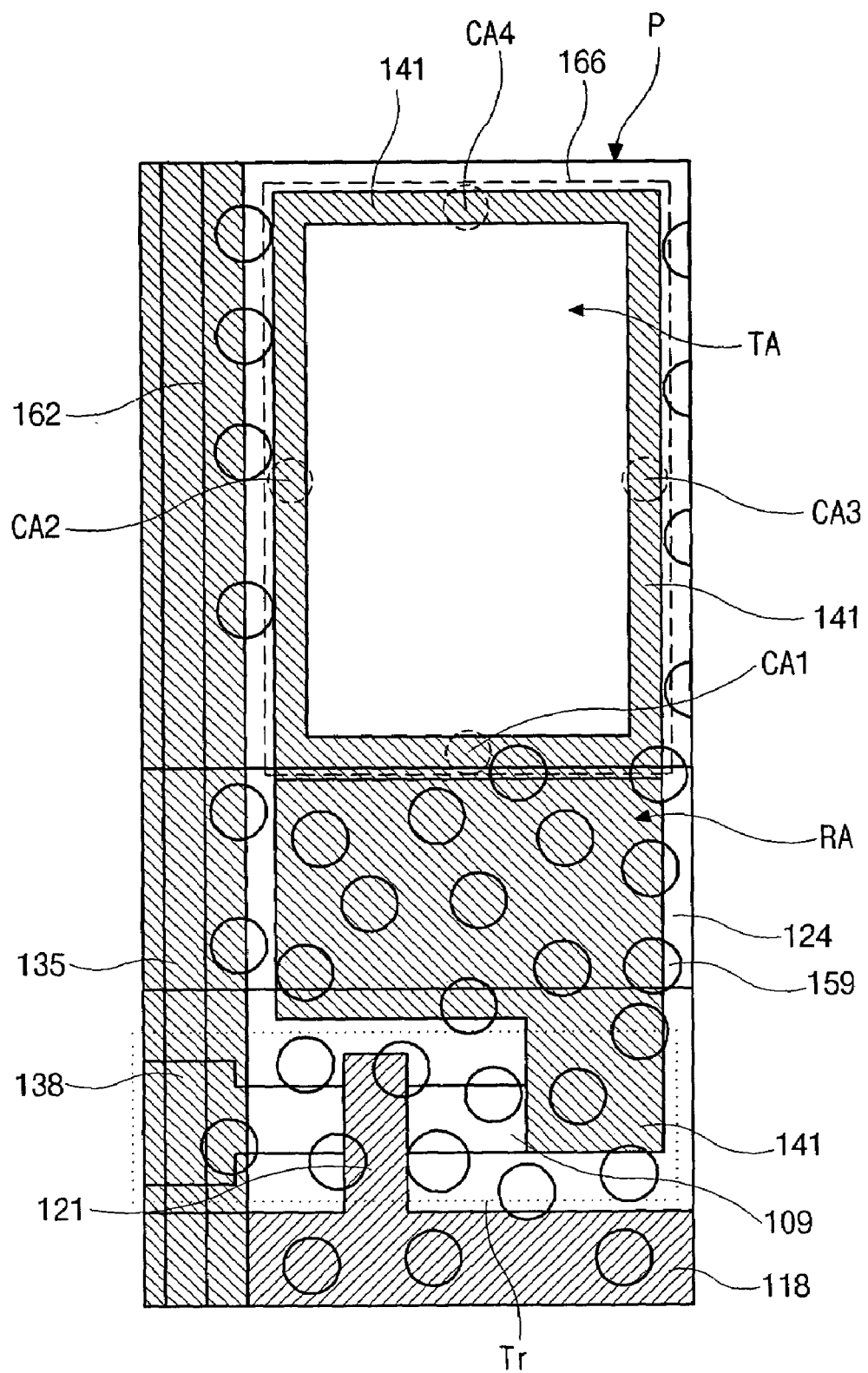
FIG. 11 is plan view of a transflective LCD, which has a pixel electrode formed only in the transparent region, according to the present invention.
Figure 12:
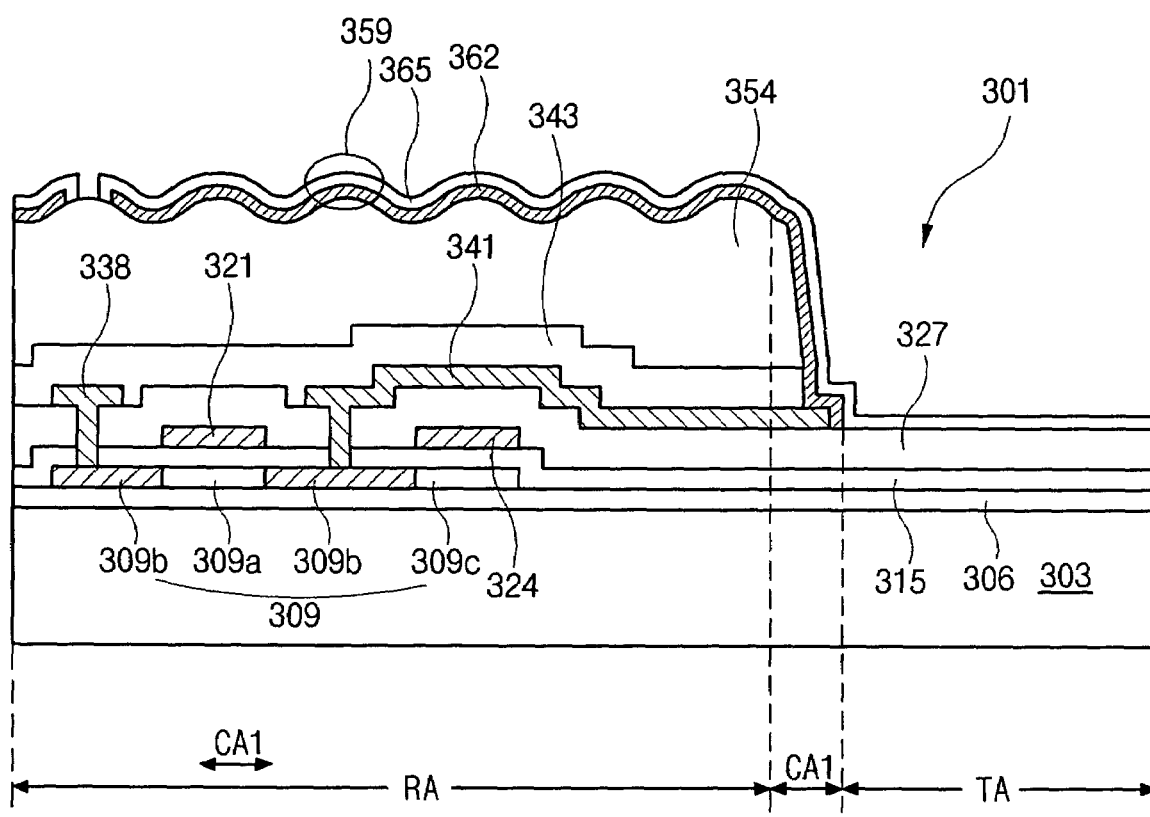
FIG. 12 is a cross-sectional view of a transflective LCD, which has an inorganic layer between the passivation layer and the source and drain electrodes, according to the present invention.

In FIG. 10J, a pixel electrode 165 of a transparent conductive material is formed on and contacts the reflective electrode 162. The pixel electrode 165 in FIG. 10J is formed in the pixel region P. However, it should be understood that the pixel electrode 166 may be formed only in the transparent region TA and contact the reflective electrode 162 in the boundary region, as shown in FIG. 11. It should be further understood that an inorganic layer 343 of an inorganic insulating material such as silicon nitride (SiNx) may be formed between the passivation layer 354 and the source and drain electrodes 338 and 341, as shown in FIG. 12. The inorganic layer 343 increases adhesion between the passivation layer 354 and the source and drain electrodes 338 and 341. The inorganic layer 343 has an opening 301 like the passivation layer 354.

Fabricating methods of the transflective LCDs according to the second to fifth embodiments of the present invention in FIGS. 5 to 8 are similar to the above-mentioned fabricating method of the transflective LCD according to the first embodiment of the present invention, except for the shapes of the drain electrode, which are illustrated in FIGS. 5 to 8.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display (LCD), comprising:
   a data line and a gate line on a substrate crossing each other to define a pixel region, the pixel region including a reflective region, a transparent region and a boundary region between the reflective region and the transparent region;
   a thin film transistor near the crossing of the gate line and the data line, the thin film transistor including a gate electrode, a semiconductor layer, a source electrode and a drain electrode;
   a passivation layer in the reflective region, the passivation layer having an opening in the transparent region and the boundary region;

a reflective electrode in the reflective and boundary regions, the reflective electrode contacting the drain electrode through the opening in the boundary region; and a transparent electrode contacting the reflective electrode.

2. The array substrate according to claim 1, wherein the passivation layer includes an inclined step in the boundary region.

3. The array substrate according to claim 1, wherein the transparent region has a rectangular shape, and the boundary region includes first, second, third and fourth boundary portions.

4. The array substrate according to claim 3, wherein the reflective electrode contacts the drain electrode in at least one of the first, second, third and fourth boundary portions.

5. The array substrate according to claim 1, wherein the transparent electrode is disposed on the reflective electrode.

6. The array substrate according to claim 1, wherein the reflective electrode has a first uneven pattern.

7. The array substrate according to claim 6, wherein a surface of the passivation layer has a second uneven pattern.

8. The array substrate according to claim 1, further comprising an inorganic insulating layer between the passivation layer and the thin film transistor.

9. The array substrate according to claim 1, further comprising a buffer layer between the thin film transistor and the substrate.

10. The array substrate according to claim 1, further comprising a gate insulating layer between the gate electrode and the semiconductor layer, and an interlayer between the gate electrode and the source and drain electrodes, the interlayer having first and second contact holes connecting the semiconductor layer to the source and drain electrodes, respectively.

11. The array substrate according to claim 10, wherein the semiconductor layer includes an active layer corresponding to the gate electrode and an ohmic contact layer connected with the source and drain electrodes and is made of a poly-crystalline silicon, the ohmic contact layer doped with impurities.

12. The array substrate according to claim 1, further comprising a storage line apart from the gate line and overlapping the semiconductor.

13. The array substrate according to claim 1, wherein the pixel electrode corresponds to one of the pixel region and the transparent region.

14. The array substrate according to claim 1, wherein the reflective electrode is made of a reflective conductive material and the transparent electrode is made of a transparent conductive material.

15. A fabricating method of an array substrate for a transflective LCD, comprising:

forming a semiconductor layer on a substrate;

forming a gate line and a gate electrode;

forming a data line crossing the gate line to define a pixel region and source and drain electrodes, the pixel region including a reflective region, a transparent region and a boundary region between the reflective region and the transparent region;

forming a passivation layer in the reflective region, the passivation layer having an opening in the transparent region and the boundary region;

forming a reflective electrode in the reflective and boundary regions, the reflective electrode contacting the drain electrode through the opening in the boundary region; and forming a transparent electrode contacting the reflective electrode.

16. The fabricating method according to claim 15, wherein the passivation includes an inclined step in the boundary region.

17. The fabricating method according to claim 15, wherein the transparent region has a rectangular shape, and the boundary region includes first, second, third and fourth boundary portions.

18. The fabricating method according to claim 17, wherein the reflective electrode contacts the drain electrode in at least one of the first, second, third and fourth boundary portions.

19. The fabricating method according to claim 15, wherein the transparent electrode is formed on the reflective electrode.

20. The fabricating method according to claim 15, wherein forming the passivation layer comprising:

depositing a photo-resist on the passivation layer;

disposing a photo-mask over the passivation layer, the photo-mask having a transparent potion, a blocking potion and a semi-transparent portion;

exposing the photo-resist to a light through the photo-mask;

developing the photo-resist to form a photo-resist pattern, wherein the photo-resist pattern corresponding to the transparent potion is removed, the photo-resist pattern corresponding to the blocking portion and the semi-transparent portion is uneven; and etching the passivation layer through the photoresist pattern to form a first uneven pattern in the reflective region and the opening in the transparent and boundary regions.

21. The fabricating method according to claim 20, wherein the reflective electrode has a second uneven pattern.

22. The fabricating method according to claim 15, further comprising forming an inorganic insulating layer between the passivation layer and the thin film transistor.

23. The fabricating method according to claim 15, further comprising forming a buffer layer between the thin film transistor and the substrate.

24. The fabricating method according to claim 15, further comprising forming a gate insulating layer between the gate electrode and the semiconductor layer, and an interlayer between the gate electrode the source and drain electrodes, the interlayer having first and second contact holes connecting the semiconductor layer to the source and drain electrodes, respectively.

25. The fabricating method according to claim 24, wherein the semiconductor layer includes an active layer corresponding to the gate electrode and an ohmic contact layer connected with the source and drain electrodes and is made of a poly-crystalline silicon.

26. The fabricating method according to claim 25, wherein forming the active layer and the ohmic contact layer comprising:

depositing and patterning a photo-resist on the gate insulating layer to form a blocking mask corresponding to the active layer; and doping the semiconductor layer with impurities through the blocking mask.

27. The fabricating method according to claim 15, further comprising forming a storage line apart from the gate line and overlapping the semiconductor.

28. The fabricating method according to claim 15, wherein the pixel electrode corresponds to one of the pixel region and the transparent region.

29. The fabricating method according to claim 15, wherein the reflective electrode is made of a reflective conductive material and the transparent electrode is made of a transparent conductive material.

30. The array substrate according to claim 1, wherein the passivation layer includes a photo-organic material.

31. The array substrate according to claim 30, wherein the photo-organic material is photo-acrylic.

32. The array substrate according to claim 1, wherein the drain electrode extends to the boundary region.

33. The fabricating method according to claim 15, wherein the drain electrode extends to the boundary region.

34. The fabricating method according to claim 15, wherein the passivation layer includes a photo-organic material.

35. The fabricating method according to claim 34, wherein the photo-organic material is photo-acrylic.

36. The array substrate according to claim 8, wherein the inorganic insulating layer has an opening in the transparent region and the boundary region.

37. The fabricating method according to claim 15, wherein forming the passivation layer comprising:

disposing a photo-mask over the passivation layer, the photo-mask having a transparent potion, a blocking potion and a semi-transparent portion, wherein the passivation layer is a photo-organic insulating layer;

exposing the passivation layer to a light through the photo-mask; and developing the passivation layer to form a first uneven pattern in the reflective region and the opening in the transparent and boundary regions, wherein the first uneven pattern corresponds to the semi-transparent portion.

* * * * *